United States Patent
Cimino et al.

(10) Patent No.: US 10,375,194 B2
(45) Date of Patent: Aug. 6, 2019

(54) METHODS AND APPARATUS TO PREVENT ILLICIT PROXY COMMUNICATIONS FROM AFFECTING A MONITORING RESULT

(71) Applicant: The Nielsen Company (US), LLC, New York, NY (US)

(72) Inventors: Susan Cimino, Tampa, FL (US); Achilleas Papakostas, Dallas, TX (US)

(73) Assignee: The Nielsen Company (US), LLC, New York, NY (US)

( * ) Notice: Subject to any disclaimer, the term of this patent is extended or adjusted under 35 U.S.C. 154(b) by 135 days.

(21) Appl. No.: 14/928,610

(22) Filed: Oct. 30, 2015

(65) Prior Publication Data

US 2017/0126534 A1   May 4, 2017

(51) Int. Cl.
*H04L 29/06* (2006.01)
*H04L 29/08* (2006.01)
*H04L 29/12* (2006.01)

(52) U.S. Cl.
CPC ...... *H04L 67/2814* (2013.01); *H04L 63/1425* (2013.01); *H04L 61/2015* (2013.01); *H04L 61/6095* (2013.01)

(58) Field of Classification Search
USPC .......................................................... 709/220
See application file for complete search history.

(56) References Cited

U.S. PATENT DOCUMENTS

| | | | |
|---|---|---|---|
| 6,687,732 B1 | 2/2004 | Bector | |
| 7,735,116 B1* | 6/2010 | Gauvin | G06F 21/552 |
| | | | 713/153 |
| 9,301,173 B2 | 3/2016 | Papakostas | |
| 2004/0221043 A1* | 11/2004 | Su | H04L 12/18 |
| | | | 709/227 |
| 2006/0282660 A1 | 12/2006 | Varghese | |
| 2007/0147777 A1* | 6/2007 | Kurosawa | H04N 5/775 |
| | | | 386/247 |
| 2009/0265456 A1* | 10/2009 | Bouvier | H04L 63/1416 |
| | | | 709/224 |
| 2012/0158908 A1 | 6/2012 | Luna | |

(Continued)

OTHER PUBLICATIONS

Wei Gao, Thomas Morris, Bradley Reaves, and Drew Richey, Department of Electrical and Computer Engineering, Mississsippi State University, 978-1-4244-7761-6/10 2010 IEEE.*

*Primary Examiner* — Umar Cheema
*Assistant Examiner* — John Fan
(74) *Attorney, Agent, or Firm* — Hanley, Flight & Zimmerman, LLC

(57) ABSTRACT

Methods, apparatus, systems and articles of manufacture to prevent illicit proxy communications from affecting a monitoring result are disclosed. An example method includes accessing a log of communications from a proxy. A subnet represented in the log of communications is identified. The subnet is identified as having originated an illicit network communication if the log of communications does not include at least one record matching a signature of a mobile device heartbeat originating from the subnet. A blacklist of subnets not to be serviced by the proxy is generated, the blacklist including the subnet when the subnet is identified as having originated the illicit network communication. The blacklist is provided to the proxy. The blacklist is to prevent a subnet that originated the illicit network communication from affecting the monitoring result.

21 Claims, 6 Drawing Sheets

(56) References Cited

U.S. PATENT DOCUMENTS

| | | | |
|---|---|---|---|
| 2013/0007849 A1* | 1/2013 | Coulter | G06F 21/10 726/4 |
| 2013/0132854 A1* | 5/2013 | Raleigh | G06F 3/0482 715/738 |
| 2013/0332601 A1* | 12/2013 | Nakil | G06N 99/005 709/224 |
| 2014/0280896 A1 | 9/2014 | Papakostas | |

* cited by examiner

| | 305 | 310 | 315 | 320 | 325 |
|---|---|---|---|---|---|
| | IP ADDRESS | URL | USER AGENT | PORT | TIMESTAMP |
| 340 | 206.113.192.12 | https://auth.intronis.com | iCloudBackup/1.1 CFNetwork/ 485.12.7 Darwin/ 10.4.0 | 14441 | 10/15/2015 15:06:44 UTC-06:00 |
| 345 | 206.113.192.13 | http://www.website1.com | Mozilla/5.0 (iPhone; CPU iPhone OS 7_0_2) AppleWebKit/ 537.51.1 | 14441 | 10/15/2015 16:07:23 UTC-06:00 |
| 350 | 45.65.78.120 | http://www.website2.com | AppleCoreMedia/ 1.0.0.11A501 | 6512 | 10/15/2015 17:06:18 UTC-06:00 |
| 355 | 38.98.186.130 | http://www.paymentsite.com | Mozilla/5.0 (Windows NT 6.3; WOW64; rv:39.0) Gecko/20100101 Firefox/39.0 | 80 | 10/15/2015 19:12:24 UTC-06:00 |
| 360 | 67.54.32.10 | http://www.mediaprovider.com | Mozilla/5.0 (Windows NT 6.3; WOW64; rv:39.0) Gecko/20100101 Firefox/39.0 | 30000 | 10/15/2015 20:54:32 UTC-06:00 |

FIG. 3 though a remote proxy server remains a viable option with modern proxies such as Squid, Microsoft Forefront TMG, Apache and/or any other proxy server. Example proxy servers respond to requests from the device(s) of the panelist(s) without requiring authentication from the device(s). As such, panelists do not need user names and/or passwords to access the proxy system. Unfortunately, not requiring credentials enables non-panelist users to also use the proxy. Such non-panelist users might attempt to utilize the proxy system for various reasons. For example, the proxy server might be used to access a website that would otherwise be unavailable to the non-panelist user (e.g., to bypass restrictions on website access), the non-panelist user may utilize the proxy server to attempt to anonymize their identity using the proxy (e.g., to hack other services or websites, to conduct online business but hide their true Internet Protocol (IP) address, etc.), the non-panelist user may attempt to affect a monitoring result by using the proxy (e.g., by directing additional non-legitimate traffic towards a monitored website to result in a higher rating for that monitored website,) etc.

METHODS AND APPARATUS TO PREVENT ILLICIT PROXY COMMUNICATIONS FROM AFFECTING A MONITORING RESULT

FIELD OF THE DISCLOSURE

This disclosure relates generally to media monitoring, and, more particularly, to methods and apparatus to prevent illicit proxy communications from affecting a monitoring result.

BACKGROUND

In recent years, methods of accessing Internet content have evolved. For example, Internet content was formerly primarily accessed via computer systems such as desktop and laptop computers. Recently, handheld mobile devices (e.g., smartphones) have been introduced that allow users to request and view Internet content.

BRIEF DESCRIPTION OF THE DRAWINGS

FIG. 3 is an example data table representing data that may be stored in the example proxy log database of FIGS. 1 and/or 2.

The figures are not to scale. Wherever possible, the same reference numbers will be used throughout the drawing(s) and accompanying written description to refer to the same or like parts.

DETAILED DESCRIPTION

Figure 1:
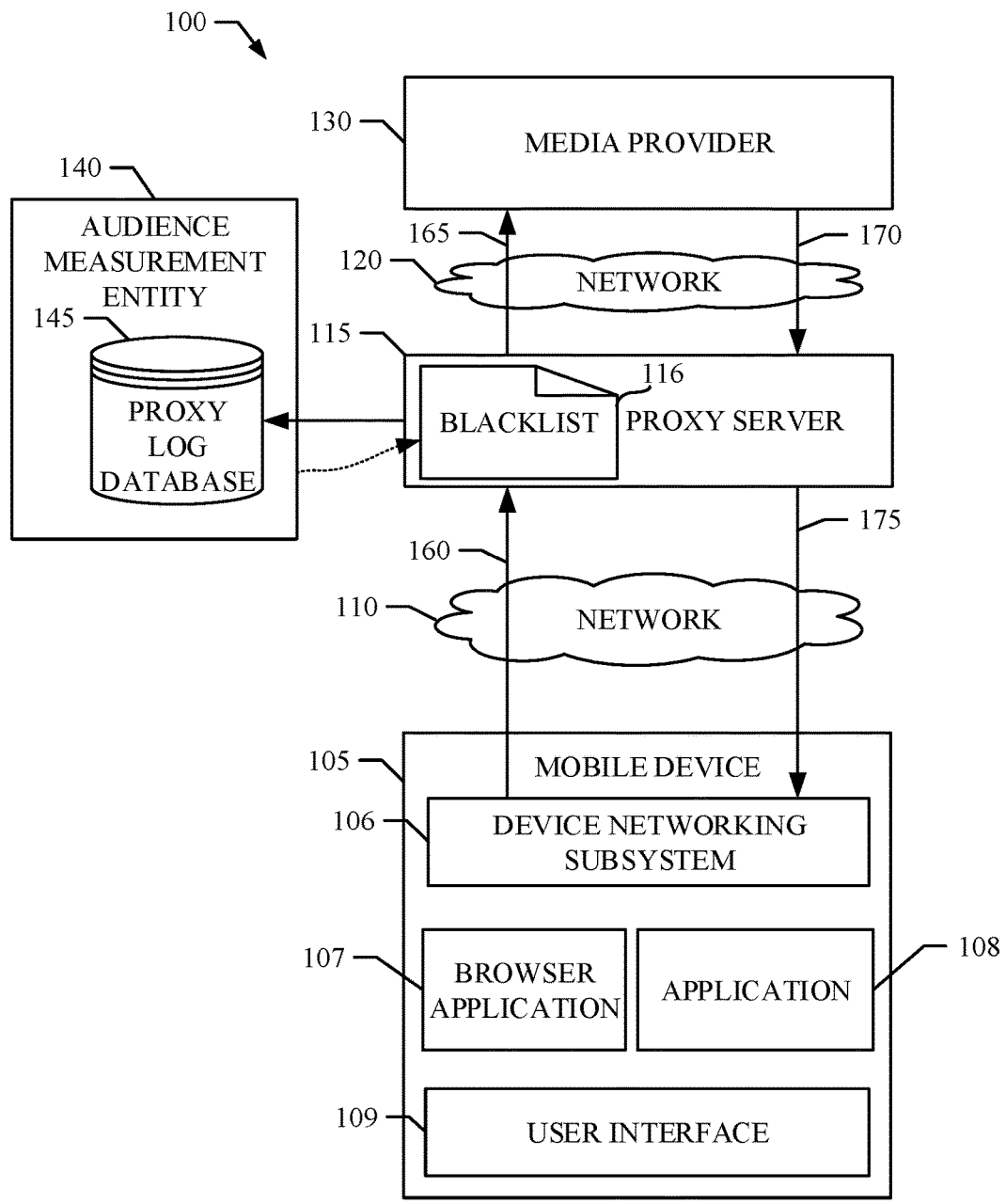
FIG. 1 is a block diagram of an example system constructed in accordance with the teachings of this disclosure to prevent illicit proxy communications from affecting a monitoring result.

Monitoring companies desire to gain knowledge on how users interact with their handheld mobile devices, such as smartphones. For example, monitoring companies want to monitor Internet traffic to and/or from the handheld mobile devices to, among other things, monitor exposure to advertisements, determine advertisement effectiveness, determine user behavior, identify purchasing behavior associated with various demographics, credit application usage, etc. Some known systems have utilized a proxy server to monitor Internet content being transmitted to and from the monitored device.

Proxy servers relay requests for media (e.g., images, video, webpages, etc.) from a requesting device to a server and, in turn, relay a response from the server to the requesting device. In examples disclosed herein, the proxy server creates a log of such requests and/or responses to facilitate monitoring of the media devices that use the proxy server. Mobile devices commonly include multiple communication options such as, for example, a Wi-Fi radio, a cellular radio, etc. In some examples, mobile devices can be configured to route requests for media to (and/or through) a proxy server.

As used herein, the term "media" includes any type of content and/or advertisement delivered via any type of distribution medium. Thus, media includes television programming or advertisements, radio programming or advertisements, movies, web sites, streaming media, etc.

Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets.

People become panelists via, for example, a user interface presented on the media device (e.g., via a website). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.).

In some examples where proxies are used to monitor panelists, each panelist is given separate configuration information for use with the proxy. For example, each panelist may be assigned a unique identifier (e.g., a port number) for use with the proxy. When using the unique identifier (e.g., the unique port number), the panelist is identifiable by the monitoring company. In some examples, the communication options of the mobile device are configured separately for different interfaces for use with the proxy. For example, a Wi-Fi radio may be configured using a proxy auto configuration (PAC) file, while a cellular radio may be configured using a profile. Example systems, methods, and apparatus for configuring a mobile device to interact with a proxy are disclosed in U.S. patent application Ser. Nos. 12/856,651; 12/856,643; and 13/174,517, each of which is hereby incorporated by reference in their entirety.

To enable monitoring of the Internet activity of the panelist(s), messages (e.g., Hypertext Transfer Protocol (HTTP) messages) from the device(s) of the panelist(s) are routed through the proxy. In some examples, the proxy responds to requests from the device(s) of the panelist(s) without requiring authentication from the device(s). As such, panelists do not need user names and/or passwords to access the proxy system. Unfortunately, not requesting credentials enables non-panelist users to also use the proxy. Such non-panelist users might attempt to utilize the proxy system for various reasons. For example, the proxy server might be used to access a website that would otherwise be unavailable to the non-panelist user (e.g., to bypass restrictions on website access), the non-panelist user may utilize the proxy server to attempt to anonymize their identity using the proxy (e.g., to hack other services or websites, to conduct online business but hide their true Internet Protocol (IP) address, etc.), the non-panelist user may attempt to affect a monitoring result by using the proxy (e.g., by directing additional non-legitimate traffic towards a monitored website to result in a higher rating for that monitored website,) etc.

As disclosed herein, non-panelist users result in illicit traffic. Illicit traffic represents use of the proxy server by unauthorized (e.g., non-panelist) entities. In some examples, blocking techniques are used in an attempt to block illicit traffic. For example, the proxy may block requests known to originate from bot and/or spider addresses. In some examples, a header of the request transmitted by the device of the non-panelist user includes a user agent. In some examples, the user agent is inspected to facilitate blocking of the request carrying the user agent. For example, user agents associated with desktop browsers do not represent mobile device requests and, as such, can be blocked. In some examples, because each panelist is assigned a unique port number, the proxy may block requests that are received via a port number that is not associated with any panelist. Unfortunately, despite such example blocking approaches, a significant amount of non-panelists user traffic is still passed through the proxy.

In examples disclosed herein, patterns in requests serviced by the proxy are analyzed to determine whether the communications originated from a mobile device. Many mobile devices that communicate via the Internet regularly transmit messages to particular servers. For example, an Apple iPhone will regularly communicate with an Apple iCloud server to back up the mobile device. As used herein, regularly occurring messages transmitted by a mobile device are referred to as a heartbeat. Because the audience measurement entity is interested in monitoring mobile device communications (e.g., communications associated with smartphones such as an Apple iPhone, communications with tablets such as an Apple iPad, etc.), when no heartbeat is detected for a threshold amount of time, it can be assumed that the device attempting to communicate via the proxy is not a mobile device, and should be blocked.

FIG. 1 is a block diagram of an example system 100 constructed in accordance with the teachings of this disclosure to prevent illicit proxy communications from affecting a monitoring result. The block diagram of FIG. 1 illustrates an example communication between the mobile device 105, a first network 110, the proxy 115, a second network 120, and a media provider 130.

The example system monitors Internet traffic to and/or from handheld mobile devices (e.g., a mobile device 105). If the monitored Internet traffic does not originate from an IP address in a blacklist 116, the monitored Internet traffic is allowed to pass through the proxy server 115. A record of the communication between the monitored devices (e.g., the mobile device 105) and Internet sites (e.g., media provider 130) is routed to an audience measurement entity (AME) 140. As shown in FIG. 1, the traffic passes through a proxy 115 of the example monitoring system 100. The proxy 115 creates a log of the traffic passing through the proxy 115, and provides the log to a central facility operated by the AME 140 (e.g., the Nielsen Company (US), LLC). In examples disclosed herein, the example AME hosts a proxy log database 145 that stores proxy log information generated by the proxy server 115. The example AME 140 generates and provides the blacklist 116 to the proxy server 115 to facilitate blocking of illicit communications at the proxy server 115. The example AME is further disclosed in connection with FIG. 2.

In the illustrated example, the example monitoring system 100 is shown as multiple computing systems (e.g., the proxy server 115 is separate from the AME 140). However, the monitoring system 100 may alternatively be comprised of a single computing system. In the illustrated example, the monitoring system 100 includes the example proxy 115 and the example AME 140. However, additional structures may be implemented to carry out one or more portions of the functionalities implemented by the example proxy 115, the example AME 140, and/or other structures associated with one or more additional and/or alternative functions.

The example mobile device 105 of FIG. 1 is a handheld mobile device. While in the illustrated example the mobile device 105 is shown as a cellular phone, any other type of device may be used. For example, other types or phones (e.g., an Apple® iPhone®), a laptop computer, a desktop computer, a personal digital assistant (PDA), a netbook, or a tablet computer (e.g., an Apple® iPad™) may additionally or alternatively be used. The mobile device may be implemented with any mobile operating system, and may be implemented with any type of hardware and/or form factor. In the illustrated example, the mobile device communicates via a wireless interface. However, any other type(s) of communication interface may additionally or alternatively be used such as, for example, an Ethernet connection, a Bluetooth connection, a Wi-Fi connection, a cellular connection (e.g., a Time Division Multiple Access (TDMA) connection, Code Division Multiple Access (CDMA) connection, Worldwide Interoperability for Microwave Access (WiMAX) connection, Long Term Evolution (LTE) connection, etc.)

In the illustrated example, the mobile device 105 is associated with a panelist participating in a monitoring service. Although the example system of FIG. 1 is a panelist-based system, non-panelist and/or hybrid panelist systems may alternatively be employed. In the panelist system of the illustrated example, demographic information is obtained from the user when the user joins and/or registers for the panel. The demographic information may be obtained from the user via a telephone interview, by having the user complete an online survey, etc. Additionally or alternatively, panelists may be contacted and/or enlisted using any desired methodology (e.g., random selection, statistical selection, phone solicitations, Internet advertisements, surveys, advertisements in shopping malls, etc.).

In the illustrated example, a first panelist is associated with the mobile device 105. In the illustrated example, the mobile device 105 is owned, leased, or otherwise belongs to the first panelist. The monitoring entity of the illustrated example does not provide the mobile device to the first panelist. In other systems, panelists may be provided with mobile devices to participate in the panel. While in the illustrated example, the mobile device 105 is associated with a single panelist, the mobile device 105 may alternatively be associated with more than one panelist. For example, a family may have a single mobile device (e.g., a tablet computer) that may be shared amongst multiple users. The sharing of a client device is less common when the client device is a cellular phone than when the client device is a portable computer (e.g., an Apple® iPad™).

The proxy 115 of the illustrated example stores the requests for Internet content and/or portion(s) of such requests originating from the mobile device 105 in the proxy log database 145 in association with the port numbers over which the request was received. Example data collected by the proxy 115 includes an IP Address of the mobile device 115, a proxy port number for a request, a timestamp (e.g., a timestamp in a format such as: 2015-08-15 15:06:44-0400), a request method including a full requested URL and/or a query string, a status code of a response to the request, a size of a response to the request (e.g., a size of the payload, excluding headers), a User Agent, an X-DSID (e.g., a user id for iTunes or App Store on a iPhone), an X-Apple-Client-Application field value (e.g., "Software" for AppStore, "WiFi-Music" for iTunes), a referrer, a content type of a response to the request, a total size of a response to the request (e.g., a total size of the payload and HTTP headers), and/or time taken to serve the request (e.g., in microseconds). In storing the requests, the proxy 115 may additionally store other identifiers such as, for example, the identifier of the mobile device 105, and/or an identifier of the panelist. Additionally or alternatively, the proxy 115 may store a portion of the Internet content in the proxy log database 145. For example, the proxy 115 may store the body of a webpage transmitted to the mobile device 105. In another example, the proxy 115 may store an identifier of an advertisement appearing on the webpage transmitted to the client. This is particularly useful in situations where advertisements are rotated at websites. Additionally or alternatively, the proxy 115 may store characteristics of the response, such as, for example the HTTP header, a status code of the HTTP header, a content type of the HTTP header, etc.

The media provider 130 supplies content to clients via the Internet. In the illustrated example, the proxy 115 acts as an intermediary for the mobile device 105, and, thus, is the client of the media provider 130. Internet media is often supplied over port 80, as most Internet content is in the form of HTTP data. However, any other port may be used to supply Internet media. For example, file transfer protocol (FTP) data may be transmitted over port 21, HTTP over Secure Socket Layer (SSL) may be transmitted over port 443, etc.

The media provider 130 can be implemented by any number and/or type of media provider. For example, the media provider 130 may be implemented as a web server hosting webpages formatted as Hypertext Markup Language (HTML) content. Alternatively, the media provider 130 may be an application server providing application content (e.g., media, audio, video, etc.) to applications accessing Internet content. The application content may be formatted as HTML, XML, or may use any other protocol or port to return content to the requester. In some examples, the application data is implemented in a protocol specifically targeted for an application (e.g., a weather application) requesting media.

Log files from the proxy server(s) 115 contain information regarding mobile device 105 user activity such as visits to web sites, launching and interacting with applications, and streaming media requests transmitted to the media provider(s) 130. These log files are transmitted to the proxy log database 145 of the AME 140 (e.g., the Nielsen Company (US), LLC).

The example proxy log database 145 of the illustrated example of FIG. 1 may be implemented on any device for storing data such as, for example, flash memory, magnetic media, optical media, etc. Furthermore, the data stored in the example proxy log database 145 may be in any data format such as, for example, binary data, comma delimited data, tab delimited data, structured query language (SQL) structures, extensible markup language (XML) data, etc. While in the illustrated example the example proxy log database 145 is illustrated as a single database, the example proxy log database 145 may be implemented by multiple databases. The example proxy log database 145 stores records received from the proxy 115 in the form of a proxy log. Example records that may be stored in the example proxy log database 145 are described below in connection with the illustrated example of FIG. 3.

The mobile device 105 includes a networking subsystem 106, a browser application 107, an application 108, and a user interface 109. The networking subsystem 106 provides a framework for transmitting and receiving content. The networking subsystem 106 may be implemented via an application processor, a software system that facilitates networked communication, a browser engine, a baseband processor that transmits network traffic, and/or any other system that provides a framework for transmitting and receiving media. As used herein, the term "media" includes any type of content and/or advertisement delivered via any type of distribution medium. Thus, media includes television programming or advertisements, radio programming or advertisements, movies, web sites, streaming media, etc.

In the illustrated example, the networking subsystem 106 is implemented by the networking libraries provided in the Apple® iPhone® operating system. However, any other libraries, systems, or programs may additionally or alternatively be used. In examples disclosed herein, as part of the operation of the mobile device 105, the device networking subsystem 106 transmits requests related to the operation of the mobile device 105 (e.g., a request to check for update from a software provider of the mobile device 105, a request to access a cloud service used by the mobile device 105). As noted above, such requests are referred to herein as heartbeats. In some examples, the request(s) may be periodic. For example, a request to determine if an update is available may be transmitted using regular intervals (e.g., once a day, every three hours, etc.). In some examples, the requests are a-periodic. For example, the request(s) may be transmitted in response to the mobile device 105 connecting to a cellular tower (e.g., the mobile device 105 may transmit a request for a location update upon connecting to the cellular tower), the request(s) may be transmitted in response to a user of the mobile device 105 entering a phone number for transmitting a short message service (SMS) message (e.g., the mobile device may transmit a lookup request of the entered phone number to determine whether the SMS message can be transmitted to the phone number using Apple® iMessage®).

The browser application 107 and application 108 are applications that are executed by a processor of the mobile device 205. The browser application 107 requests HTTP Internet content from the media provider 130, and renders the HTTP content for display. Additionally or alternatively, the browser application may request and render HTTPS Internet content. In some examples, the browser application 107 is implemented by Apple® Safari®. However, any other application may alternatively be used. For example, Pocket Internet Explorer may be used. In some examples, the HTTP Internet content is HTML content. However, the content may be presented in any format that may be rendered by the browser application 107.

The application 108 may be any application on the mobile device 105 that requests media. For example, the application 108 may be a weather application accessing media provided by www.weather.com. Applications are commonly referred to as "apps." The media provider 130 providing content for www.weather.com may respond to media requests with HTML data. However, any other type of data may be contained in the media response. For example, the media provider 130 providing media for www.weather.com may provide an XML file including a condensed weather forecast. Additionally or alternatively, the application 108 may request media such as, for example, photos, video, audio, etc. Typically, applications accessing media are limited to a small amount of information to be displayed. For example, the weather application may not be able to display sports news. Although the browser 107 or the application 108 may initiate requests for media, in some devices, such as the Apple® iPhone®, requests are formatted and transmitted by the device networking subsystem 106 based on system wide settings that control routing and/or addressing of such requests (e.g., to a specific port of the proxy 115).

In some examples, the application 108 implements functionality of the mobile device 105 that transmits a heartbeat via the networking subsystem 106. For example, an application (e.g., an iCloud application) of an Apple iPhone will regularly communicate with an Apple iCloud server to back up the mobile device 105. Such regularly occurring messages may originate at the application 108 and may be transmitted via the networking subsystem 106.

The user interface 109 of the illustrated example provides a display to the user and receives input from the user. The user interface 109 may comprise hardware, a graphics library, and/or a graphics driver for displaying content to the panelist, and may comprise hardware, an input library, and/or an input driver for receiving input from the panelist. Either or both the browser application 107 and/or the application 108 may utilize the user interface to display media and receive input.

Figure 2:
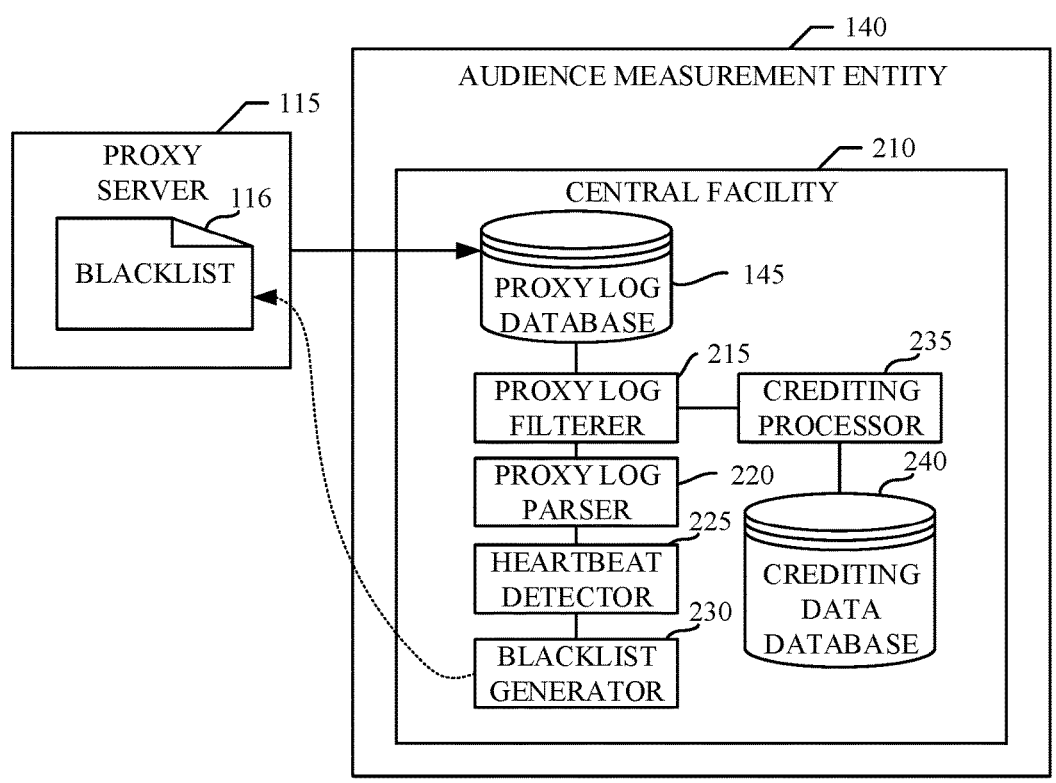
FIG. 2 is a block diagram illustrating the example audience measurement entity of FIG. 1.

The first and second networks 110, 120 of the illustrated example of FIG. 2 are public networks (e.g., the Internet). However, a private network may instead be employed for one or more of the first and/or second networks 110, 120. For example, a network internal to an organization and/or company may be used to determine how members of the organization and/or employees of the company utilize mobile devices. In the illustrated example, the first and second networks 110, 120 are Internet Protocol (IP) version 4 (IPv4) based networks. However, any other networking technology may additionally or alternatively be implemented. For example, the networks 110, 120 may implement the IP version 6 (IPv6) protocol.

The proxy 115 of the illustrated example receives a first request 160 for Internet content from the mobile device 105, retrieves the content by sending a second request 165 to the corresponding content provider 170, receives the content in a response 170 from the content provider 170, and relays the content to the mobile device 105 via a second response 175. In the illustrated example, the proxy 115 stores characteristics and/or identifiers of the request and/or response in the proxy log database 145. These characteristics and/or identifiers may be, for example, a timestamp of the request and/or response, an IP address of the mobile device, a user agent of the request, a status code of the response, a content type of the response, etc. However, the proxy 115 may additionally store the media of the response in the proxy log database 145.

The illustrated example of FIG. 1 shows a communication stream for a single communication session. In the example of FIG. 1, a first request 160, a second request 165, a first response 170, and a second response 175 are shown. The first request 160 is transmitted to the proxy 115 from the mobile device 105 over the first network 110 (e.g., a carrier network). The first request 160 uses the unique port assigned to the mobile device 105 (e.g., port 50,000), and is for HTTP media (e.g., the request is for content that is served over port 80). However, the media requested may be requested over any port. For example, the request may be for file transfer protocol (FTP) content and may occur over port 21. The proxy 115, upon receiving the first request 160, determines whether the request originated from an IP address listed in the blacklist 116. If the request did not originate from the IP address listed in the blacklist 116, the example proxy server 115 stores some or all of the first request 160 in the proxy log database 145, and generates a second request 165. The second request is addressed to the media provider 130 identified in the first request 160. The second request 165 in the illustrated example is transmitted via the second network 120 over port 80, because the first request 160 identified media to be served over port 80. The media provider 130 responds to the second request 165 with the first response 170. The proxy 115 receives the first response 170 via port 80, optionally stores some or all of the request in the proxy log database 145, and forwards the media of the first response 170 as the second response 175 to the mobile device 105 over the port assigned to the mobile device 105.

FIG. 2 is a block diagram illustrating the example audience measurement entity 140 of FIG. 1. The example AME 140 of FIG. 1 implements a central facility 210. In examples disclosed herein, the example central facility 210 is implemented by one or more servers. The example central facility 210 of FIG. 2 includes the example proxy log database 145, an example proxy log filterer 215, an example proxy log parser 220, an example heartbeat detector 225, an example crediting processor 235, an example crediting data database, and an example blacklist generator 230. The example blacklist generator 230 generates an example blacklist 116 that is provided to the proxy 115 such that the proxy 115 may block requests from hosts identified in the blacklist 116.

The example proxy log filterer 215 of the illustrated example of FIG. 2 filters requests received by the proxy 115 and stored in the proxy log database 145 based on one or more filters. The example proxy log filterer 215 creates a filtered request log that is inspected by the example proxy log parser 220. In the illustrated example, the proxy log filterer 215 filters requests based on, for example, a port number of the received request, a user agent of the received request, a URL of the received request, a content type of the received request, an HTTP status message of the received request, an HTTP status code of a message returned to the proxy 115 by the media provider 130, a parameter of an HTTP response received by the proxy 115 (e.g., a response to a request transmitted to the media provider 130 on behalf of the mobile device 105), etc. In examples disclosed herein, the example proxy log filterer 215 filters requests and/or responses to remove records that are not related to crediting. For example, the example proxy log filterer 215 may remove records that contain invalid information, data errors (e.g., messages including an HTTP status code indicating that there was an error in serving the response), duplicate records, etc.

The example proxy log parser 220 of the illustrated example of FIG. 1 parses filtered proxy logs created by the example proxy log filterer 215. In examples disclosed herein, the example proxy log parser 220 inspects the filtered proxy log to identify, for example, IP address subnets having corresponding communications in the filtered proxy log, a number of records appearing in the filtered proxy log, a number of unique user agents appearing in the filtered proxy log, a number of ports used in the filtered proxy log, etc. In some examples, the example proxy log parser 220 performs a geographic region lookup using an IP address subnet appearing in the example filtered proxy log to identify a geographic region of the IP address subnet.

The example heartbeat detector 225 of the illustrated example of FIG. 1 inspects records of the example filtered proxy log to identify, for example, whether the record should be considered a heartbeat. In examples disclosed herein, the example heartbeat detector 225 compares user agents and/or universal resource locators (URLs) of each record of the filtered proxy log to user agent and/or URL pairs associated with known heartbeats.

The example blacklist generator 230 of the illustrated example of FIG. 1 generates the blacklist file 116 to be provided to the example proxy server 115. In examples disclosed herein, the example blacklist file 116 includes identification(s) of IP address subnets that have been identified as originating illicit communications by the example proxy log parser 220. In examples disclosed herein, the example blacklist file 116 is a text file that includes IP address entries corresponding to each IP address subnet identified as illicit. In some examples, the example blacklist file 116 is a comma separated value (CSV) file. However, any other past, present, and/or future type of file may additionally or alternatively be used.

The example crediting processor 235 of the illustrated example of FIG. 1 processes records stored in the proxy log database 145 to identify usage sessions and/or durations associated with those usage sessions (e.g., how long an application was used, how long a website was viewed, etc.). Example approaches for crediting a usage session are disclosed in U.S. patent application Ser. Nos. 62/113,177; 13/840,594; and 13/840,543, which are hereby incorporated by reference in their entireties. In some examples, the example proxy log filterer 215 filters the records of the proxy log database 145 according to the blacklist 116 prior to crediting by the crediting processor 235 to prevent records associated with a subnet placed on the blacklist from affecting the monitoring result of the crediting processor 235. In some examples, the subnet may have originated illicit traffic that is stored in the proxy log database 145 prior to having been identified for inclusion on the blacklist. The example crediting processor 235 stores the result of the crediting operations in the crediting data database 240.

The example crediting data database 240 of the illustrated example of FIG. 1 may be any device for storing data such as, for example, flash memory, magnetic media, optical media, etc. Furthermore, the data stored in the example crediting data database 240 may be in any data format such as, for example, binary data, comma delimited data, tab delimited data, structured query language (SQL) structures, etc. While in the illustrated example the example crediting data database 240 is illustrated as a single database, the example crediting data database 240 may be implemented by multiple databases. The example crediting data database 240 stores crediting data generated by the crediting processor 235. Such crediting data enables, for example, a panelist to be associated with particular Internet activity (e.g., streaming media, using apps, viewing websites, etc.). More generally, the crediting data enables demographic groupings of panelists to be associated with various Internet activities. Such associations are useful to the AME 140 to enable identification of, for example, which demographic groups perform different types of Internet activities.

FIG. 3 is an example data table 300 representing data that may be stored in the example proxy log database 145 of FIG. 1. The example data table 300 includes an Internet Protocol (IP) address column 305, a Universal Resource Locator column 310, a User Agent column 315, a port column 320, and a timestamp column 325. The example data table 300 includes a first example row 340, a second example row 345, a third example row 350, a fourth example row 355, and a fifth example row 360. The example rows 340, 345, 350, 355, 360 correspond to requests received at the proxy 115.

The example IP address column 305 of the illustrated example of FIG. 3 identifies IP addresses that initiated the communication identified by each row. In examples disclosed herein, the IP address is an IP version 4 address. However, any other past, present, and/or future IP address may additionally or alternatively be used such as, for example, an IPv6 address.

The example URL column 310 of the illustrated example of FIG. 3 identifies a URL requested by the mobile device 105 via the proxy server 115. In the illustrated example of FIG. 3, the example URL column 310 identifies websites to which requests were directed using a hypertext transfer protocol (HTTP). However, any other past, present, and/or future protocol(s) may additionally or alternatively be represented in the example URL column 310 of FIG. 3.

The example user agent column 315 of the illustrated example of FIG. 3 identifies a user agent of the mobile device 105 that was used to transmit the request identified by the respective column 340, 345, 350, 355, 360 of FIG. 3. In some examples, the example user agent column 315 is used to identify when, for example, the device transmitting the request should be identified as a mobile device (e.g., a device that does not originate illicit traffic). If, for example, a requesting device communicates for a period of time, but does not transmit a threshold number of requests using a user agent identifying the requesting device as a mobile device, the requesting device may be considered to not be a mobile device (e.g., a device that originates illicit traffic).

The example port column 320 of the illustrated example of FIG. 3 identifies a port on which the request identified by the respective record 340, 345, 350, 355, 360 of FIG. 3 was received. In examples disclosed herein, the port is represented by a number. However, any other representation may additionally or alternatively be used. For example, the port may be represented using a hexadecimal value. In examples disclosed herein, each different numerical value is assigned to a unique user to facilitate identification of the user. When the mobile device 105 of the user transmits a request, the request is transmitted to the proxy using the port assigned to the user. For example, the first record 340 of FIG. 3 indicates a port number of 14441. Likewise, the second record 345 of FIG. 3 indicates a port number of 14441, thereby indicating that the first record 340 and the second record 345 originated from the same user. If, for example, a port number were used that was not assigned to a user, such use may indicate that the communications are illicit and should be blocked.

The example timestamp column 325 of the illustrated example of FIG. 3 identifies dates and/or times at which the respective record 340, 345, 350, 355, 360 of FIG. 3 was received. In the illustrated example of FIG. 3, the example timestamp(s) are represented including a time zone offset. However, in some examples, the time zone offset may be omitted (e.g., the timestamps may be converted to a common time zone such as, for example a Coordinated Universal Time (UTC) time zone). In the illustrated example of FIG. 3, the timestamp is represented using a textual representation of a date and time. However, any other approach to representing a timestamp may additionally or alternatively be used.

In the illustrated example of FIG. 3, the first example record 340 represents a heartbeat. For example, the first example record 340 identifies that a message was transmitted from a device having an IP address of 206.113.192.12. The user agent identified in the first example record is "iCloudBackup/1.1 CFNetwork/485.12.7 Darwin/10.4.0," which identifies that the Apple iCloud backup service was used. Moreover, the port number of 14441 was used, which is, in the illustrated example, a port number associated with a panelist. Such a collection of information enables the central facility 210 to identify that the communication identified by the first example record 340 is not an illicit communication. In contrast, the fourth example record 355 identifies a user agent of "Mozilla/5.0 (Windows NT 6.3; WOW64; rv:39.0) Gecko/20100101 Firefox/39.0," which is a user agent used by a desktop browser. Moreover, the fourth example record 355 indicates that port 80 was used which is, in the illustrated example, not a port number associated with a panelist. Such information enables the example central facility 210 to identify the IP address (and/or a subnet containing the IP address) of the fourth example row 355 as originating illicit communications.

While an example manner of implementing the central facility 210 is illustrated in FIG. 1, one or more of the elements, processes and/or devices illustrated in FIG. 1 may be combined, divided, re-arranged, omitted, eliminated and/or implemented in any other way. Further, the example proxy log database 145, the example proxy log filterer 215, the example proxy log parser 220, the example heartbeat detector 225, the example blacklist generator 230, the example crediting processor 235, the example crediting data database 240, and/or, more generally, the example central facility 210 of FIG. FIG. 1 may be implemented by hardware, software, firmware and/or any combination of hardware, software and/or firmware. Thus, for example, any of the example proxy log database 145, the example proxy log filterer 215, the example proxy log parser 220, the example heartbeat detector 225, the example blacklist generator 230, the example crediting processor 235, the example crediting data database 240, and/or, more generally, the example central facility 210 of FIG. FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the the example proxy log database 145, the example proxy log filterer 215, the example proxy log parser 220, the example heartbeat detector 225, the example blacklist generator 230, the example crediting processor 235, the example crediting data database 240, and/or, more generally, the example central facility 210 of FIG. FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example central facility 210 of FIG. 2 may include one or more elements, processes and/or devices in addition to, or instead of, those illustrated in FIG. 1, and/or may include more than one of any or all of the illustrated elements, processes and devices.

Figure 4:
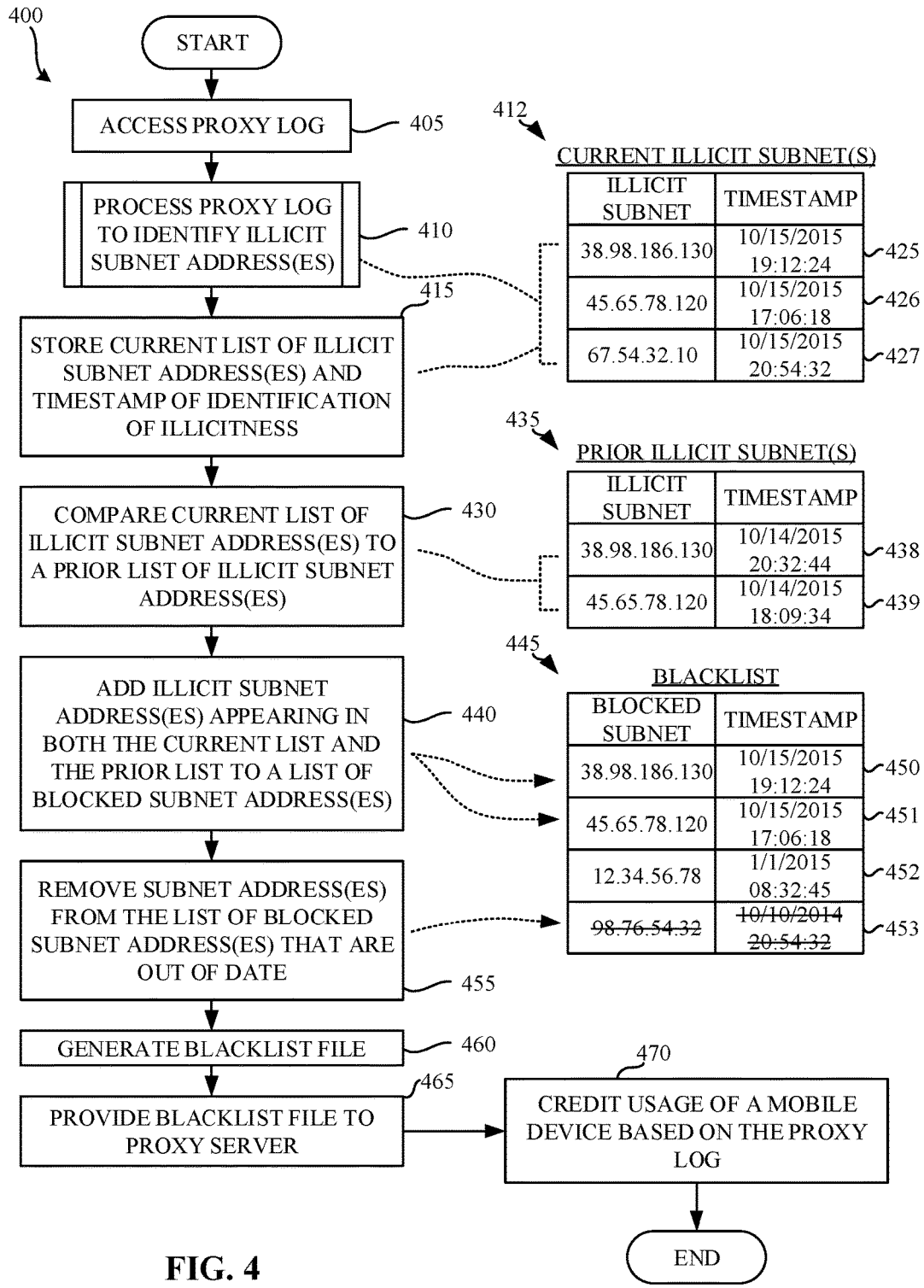
FIG. 4 is a flowchart representative of example machine instructions which, when executed, cause the example central facility to inspect a proxy log and create a blacklist file.

Flowcharts representative of example machine readable instructions for implementing the example central facility 210 of FIG. 2 are shown in FIGS. 4 and/or 5. In these example(s), the machine readable instructions comprise a program(s) for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program(s) is described with reference to the flowchart(s) illustrated in FIGS. 4 and/or 5, many other methods of implementing the example central facility 210 may alternatively be used. For example, the order of execution of the blocks may be changed, and/or some of the blocks described may be changed, eliminated, or combined.

As mentioned above, the example processes of FIGS. 4 and/or 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 4 and/or 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 4 is a flowchart representative of example machine instructions 400 which, when executed, cause the example central facility 210 to inspect a proxy log and create a blacklist file. The example program of FIG. 4 begins at block 405 when the example proxy log filterer 215 accesses the proxy log stored in the proxy log database 145. (Block 405). In examples disclosed herein, the example proxy log is stored in the proxy log database 145 of the central facility 210 by the proxy server 115. However, in some examples, the proxy log database 145 may be located at the proxy server 115 such that accessing the proxy log from the proxy log database 145 involves communicating with the proxy server 115. In examples disclosed herein, the proxy log represents a previous timeframe of requests logged by the proxy 115. In the illustrated example, the proxy log represents one day of requests. In some examples, the example process 400 of FIG. 4 is repeated once per day.

The example central facility 210 process the proxy log to identify illicit subnet address(es). (Block 410). An example approach to processing the proxy log is disclosed in further detail in connection with FIG. 5. As a result of identification, the example central facility develops a listing of currently identified illicit subnets. An example listing of current illicit subnets is identified in the first example table 412 of FIG. 4. The listing of current illicit subnet address(es) and timestamps associated with the identification of those illicit address(es) (e.g., the example first table 412 of FIG. 4) are stored (Block 415) in the example proxy log database 145.

In the illustrated example of FIG. 4, the example first table 412 includes three records: a first record 425, a second record 426, and a third record 427. The first record 425, the second record 426, and the third record 427 represent IP address subnets identified as originating illicit communications, and timestamps corresponding to when those IP address subnets were identified as originating those illicit communications.

The example blacklist generator 230 compares the current list (e.g., the table 412) to a prior listing of illicit subnets. (Block 430). An example listing of prior illicit subnet(s) is shown in the second example table 435 of FIG. 4. In the illustrated example of FIG. 4, the example second table 425 includes two records: a fourth record 438, and a fifth record 439. The fourth record 438 and the fifth record 439 represent IP address subnets previously identified as originating illicit communications, and timestamps corresponding to when those IP address subnets were identified as originating those illicit communications.

The example blacklist generator 230 adds illicit subnet address(es) appearing in both the current list of illicit subnets and the prior list of illicit subnets to a list of blocked subnet address(es). (Block 440). In some examples, the list of blocked subnet address(es) is referred to as a blacklist. That is, if an IP address subnet is identified in the list of illicit subnets (e.g., the first example table 412), and the same IP address subnet is identified in the prior list of illicit subnets (e.g., the second example table 435), those matching IP address subnet(s) are added to the blacklist (e.g., an example blacklist table 445). An example blacklist is shown in the example blacklist table 445 of FIG. 4. In the illustrated example of FIG. 4, the example blacklist generator 230 determines that the first row 425 of the first example table 412, and the fourth row 438 of the second example table 435 match and, accordingly, may add the sixth row 450 to the example blacklist table 445. Likewise, in the illustrated example of FIG. 4, the example blacklist generator 230 determines that the second row 425 of the first example table 412 and the fifth row 439 of the second example table 435 match and, accordingly, may add a seventh row 451 to the example blacklist table 445. Conversely, the third row 427 of the first example table 412 does not have a corresponding row in the second example table 435 and, accordingly, is not added to the example blacklist table 445. In the illustrated example of FIG. 4, the timestamp associated with identifying the subnet as originating illicit traffic of the first example table 412 is used in the example blacklist table 445. However, in some examples, the timestamp associated with identifying the subnet as originating illicit traffic of the second example table 435 may be used in the example blacklist table 445.

The example blacklist generator 230 removes any subnets from the blacklist table 445 that are out of date. (Block 455). The example blacklist generator 230 identifies records as being out of date by comparing the timestamp of the record to a current time. If, for example, the example blacklist generator 230 identifies that the duration between the timestamp and the current time is greater than a threshold duration, the example blacklist generator 230 removes such entry from the example blacklist table 445. In examples disclosed herein, the threshold duration is one year. In the illustrated example of FIG. 4, an eighth row 452 represents a subnet that was previously identified for inclusion in the blacklist table 445, but has not yet reached a threshold amount of time since inclusion in the blacklist table 445 to be removed from the blacklist table 445. As a result, the eighth row is not removed. In contrast, a ninth row 453 of the example blacklist table 445 is removed because the timestamp associated with that record is more than one year old. However, any other threshold duration may additionally or alternatively be used such as, for example, one week, one month, two years, etc.

The example blacklist generator 230 then generates the blacklist file 116. (Block 460). In the illustrated example, the blacklist file 116 is a text file that includes the blocked subnet(s) of the blacklist table (e.g., the blacklist table 445). However, the blacklist file 116 may be formatted in any other past, present, and/or future format. The example blacklist file 116 is provided to the proxy server 115. (Block 465). The proxy server 115 then uses the blacklist file 116 to identify whether a request received at the proxy server 115 should be serviced by the proxy server 115.

The example crediting processor 235 credits usage of the mobile device 105 based on the proxy log database 145. (Block 470). In examples disclosed herein, the example crediting processor 235 identifies a user of each record using, for example, the port number on which a request was received (e.g., the port number represented in the port column 320 of FIG. 3). The crediting data is stored in the crediting data database 240. The example process 400 of FIG. 4 is repeated in response to subsequently accessing the proxy log (e.g., Block 405). In some examples, the example process 400 of FIG. 4 is repeated in a periodic fashion (e.g., once a day, twice a day). However, the example process 400 of FIG. 4 may be repeated in an a-periodic fashion (e.g., in response to a request from a user, in response to receipt of data from the proxy server 115, etc.)

Figure 5:
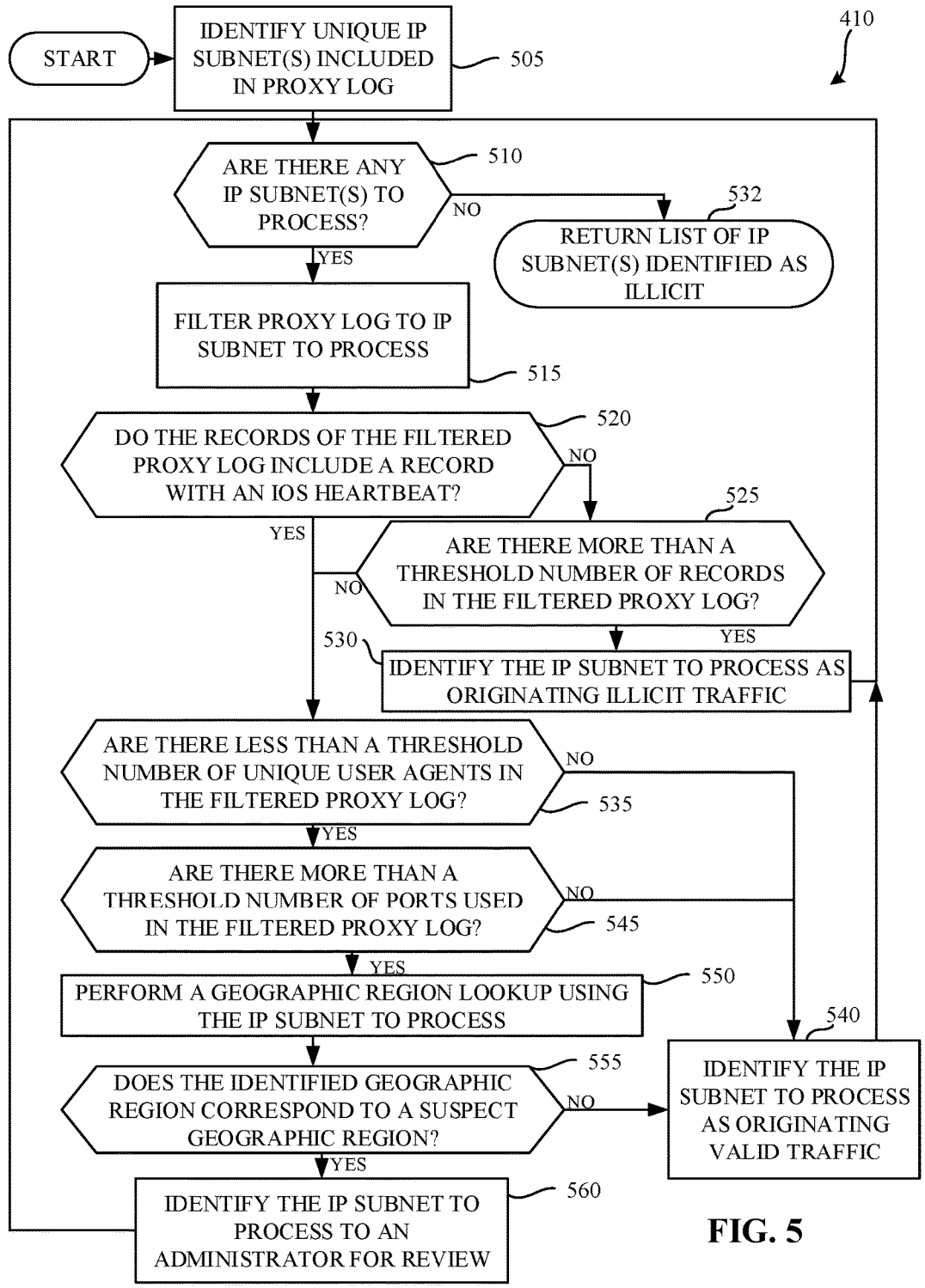
FIG. 5 is a flowchart representative of example machine-readable instructions which, when executed, cause the example central facility to determine whether traffic identified in the proxy log is illicit.

FIG. 5 is a flowchart representative of example machine-readable instructions 410 which, when executed, cause the example central facility 210 to determine whether traffic identified in the proxy log is illicit. The example process 410 of FIG. 5 begins when the example proxy log parser 220 identifies unique IP address subnets included in the proxy log. (Block 505). In examples disclosed herein, subnets are identified using groups of IP addresses, which are sometimes referred to as blocks of IP addresses. In examples disclosed herein, the IP address blocks include two hundred and fifty-six IP addresses (e.g., a "/24" block using classless inter-domain routing (CIDR) notation). However, any other size block may additionally or alternatively be used. For example, each subnet may include a single IP address (e.g., a "/32" block using CIDR notation).

In some examples, a dynamic host configuration protocol (DHCP) is used to assign IP addresses to client devices. Internet service providers typically issue (via DHCP) IP addresses that are within a same IP address block for client devices that are within a same geographic region (e.g., connected to a same node in the ISP network). In some examples, a client device may be issued a first lease for a first IP address within a first IP address block and, at a later time, may be issued a second lease for a second IP address (e.g., after expiration of the first lease). If the second IP address is included in the first IP address block, blocking the first IP address block ensures that the client device that would originate illicit traffic would not be allowed to transmit illicit traffic via the proxy 115 simply because a new IP address was issued. If the second IP address is not included in the first IP address block, illicit traffic originating from the client device is re-identified as associated with a second IP address block (e.g., an IP address block different from the first IP address block).

The example proxy log parser 220 identifies whether there are any IP address subnets to process. (Block 510). In the illustrated example of FIG. 5, each subnet identified in the proxy log is processed until all subnets have been processed. The example proxy log parser 220 selects an IP address subnet to process. The example proxy log parser 220 filters the proxy log using the selected IP subnet to be processed.

(Block 515). In examples disclosed herein, the example proxy log is filtered to create a filtered proxy log.

The example heartbeat detector 225 determines whether records of the filtered proxy log include a record with an iOs heartbeat. (Block 520). In examples disclosed herein, the iOS heartbeat is detected by inspecting each of the records in the filtered proxy log to identify whether a user agent field and a URL field of a record match a user agent and URL pattern. For example, if the user agent of a record matched "iCloudBackup/1.1 CFNetwork/485.12.7 Darwin/10.4.0," and the URL of the record matched "apple.com," the record may be identified as being associated with the Apple iCloud backup service. Such a record is considered a heartbeat, because the record is indicative of communications of a mobile device using the Apple iCloud backup service, the use of which identifies the originating device as a mobile device as opposed to a desktop computer. In the illustrated example, a list of different user agent and/or URL patterns are used. However, any other approach to determining whether a record is an iOs heartbeat may additionally or alternatively be used. For example, regular expressions may be used to determine whether the user agent and/or the URL of a record match a pattern. In examples disclosed herein, each record in the example filtered proxy log is inspected to determine if it is a heartbeat. However, any other approach to determining whether the filtered proxy log includes a record with an iOs heartbeat may additionally or alternatively be used.

In examples disclosed herein, if the filtered proxy log does not include a record with an iOs heartbeat (Block 520 returns a result of NO), the example proxy log parser 220 determines whether there are more than a threshold number of records in the filtered proxy log. (Block 525). A large number of records in the filtered proxy log indicates that a large number of requests originate from the IP address subnet. A large number of requests (e.g., a number of requests exceeding the threshold) where none of those requests include an iOS heartbeat, is indicative of illicit communications such as, for example, a desktop computer attempting to use the proxy 115 to anonymize communications, a desktop computer attempting to use the proxy 115 to gain access to an Internet site that the desktop computer would not otherwise have access, etc. Conversely, a small number of requests (e.g., a number of requests not exceeding the threshold) may be indicative of communications originating from a mobile device. In examples disclosed herein, the threshold number of requests is ten thousand requests. However, any other threshold may additionally or alternatively be used.

If the records of the filtered proxy log do not include a record with an iOs heartbeat (Block 520 returns a result of NO), and there are more than the threshold number of records in the filtered proxy log (Block 525 returns a result of YES), the example proxy log parser 220 identifies the IP subnet as originating illicit traffic. (Block 530). The example process of blocks 510-530 repeats until there are no additional IP address subnets to process (e.g., until Block 510 returns a result of NO). The list of IP address subnets identified as originating illicit traffic is then provided to the blacklist generator. (Block 532).

If either the records of the filtered proxy log include a record with an iOs heartbeat (Block 520 returns a result of YES), or there are not more than the threshold number of records in the filtered proxy log (Block 525 returns a result of NO), the example proxy log parser 220 determines whether there are less than a second threshold number of unique user agents in the filtered proxy log. (Block 535).

Having a large number of different user agents used in association with the IP address subnet is indicative of mobile device usage, as mobile devices typically use many different user agents. In contrast, desktop computers tend to use fewer user agents (e.g., a user agent associated with a desktop browser application). If there are not less than the second threshold number of unique user agents in the filtered proxy log (Block 535 returns a result of NO), the example proxy log parser 220 identifies the IP address subnet as originating valid (e.g., not illicit) traffic. (Block 540). In examples disclosed herein the second threshold is four unique user agents. However, any other value may additionally or alternatively be used.

If there are less than the second threshold number of unique user agents in the filtered proxy log (Block 535 returns a result of YES), the example proxy log parser 220 determines whether there are more than a third threshold number of ports used in association with the IP address subnet. (Block 545). In some examples, only ports other than standard ports are counted (e.g., ports other than port 80, which is commonly used for HTTP communications). In examples disclosed herein, the third threshold number of ports is three. However, any other number of ports may additionally or alternatively be used.

In examples disclosed herein, an IP address subnet using many ports is indicative of potentially illicit communications originating from that IP address subnet. Conversely, an IP address subnet using few ports is indicative of valid communications. As noted above, in the proxy system disclosed herein, ports are individually assigned to panelists. As such, each port in the filtered proxy log should correspond to a particular panelist. If, for example, five hundred ports (indicating communications from five hundred panelists) were used in association with an IP address subnet (e.g., an IP address subnet having sixteen IP addresses), it is likely that those communications are not actually associated with five hundred panelists and, accordingly, the communications from that IP address subnet should not be treated as valid communications. In some examples, the third threshold number of ports is based on a size of the IP address subnet. For example, an IP address subnet having sixteen IP addresses may use a threshold number of ports of three, whereas an IP address subnet having sixty-four IP addresses may use a threshold number of seven.

If either there are not less than the second threshold number of unique user agents in the filtered proxy log (Block 535 returns a result of NO) or there are not more than the third threshold number of ports used in the filtered proxy log (Block 545 returns a result of NO), the example proxy log parser 220 identifies the IP address subnet being processed as originating valid traffic. (Block 540). Control then returns to block 510, where the process of blocks 510-560 is repeated until all IP address subnet blocks identified in the filtered proxy log are processed (e.g., until Block 510 returns a result of NO).

Returning to block 545, if the example proxy log parser 220 determines that there are more than the third threshold number of ports used in the filtered proxy log (Block 545 returns a result of YES), the example proxy log parser 220 performs a geographic region lookup using the IP subnet address being processed. (Block 550). In examples disclosed herein, IP address to postal code detection techniques that map IP addresses to geographic locations (e.g., postal codes) are used to identify the geographic region of the IP subnet. In examples disclosed herein, the geographic region is identified as a country (e.g., the United States of America, Germany, Italy, China, etc.). However, any other type of geographic region may additional or alternatively be used.

The example proxy log parser 220 determines whether the identified geographic region corresponds to a suspect geographic region. (Block 555). In some examples, particular regions are more likely to originate illicit traffic than others. For example, if the proxy server were located in the United States of America, communications originating from outside of the United State of America may be identified as illicit. Moreover, if the proxy server were located in Germany, communications originating from Australia may be identified as illicit. If the example proxy log parser 220 does not determine that the identified geographic region corresponds to a suspect geographic region (Block 555 returns a result of NO), the example proxy log parser 220 identifies the IP address subnet being processed as having originated valid traffic. (Block 540). If the example proxy log parser 220 determines that the identified geographic region corresponds to the suspect geographic region (Block 555 returns a result of YES), the example proxy log parser 220 identifies the IP subnet being processed to an administrator for review. (Block 560). The administrator may, for example, review the communications to determine whether the thresholds (e.g., the first threshold number of records in the proxy log, the second threshold number of unique user agents, the third threshold number of ports, etc.) should be modified to more accurately identify communications as valid or illicit. Control then returns to block 510, where the process of blocks 510-560 is repeated until all IP address subnet blocks identified in the filtered proxy log are processed (e.g., until Block 510 returns a result of NO).

Figure 6:
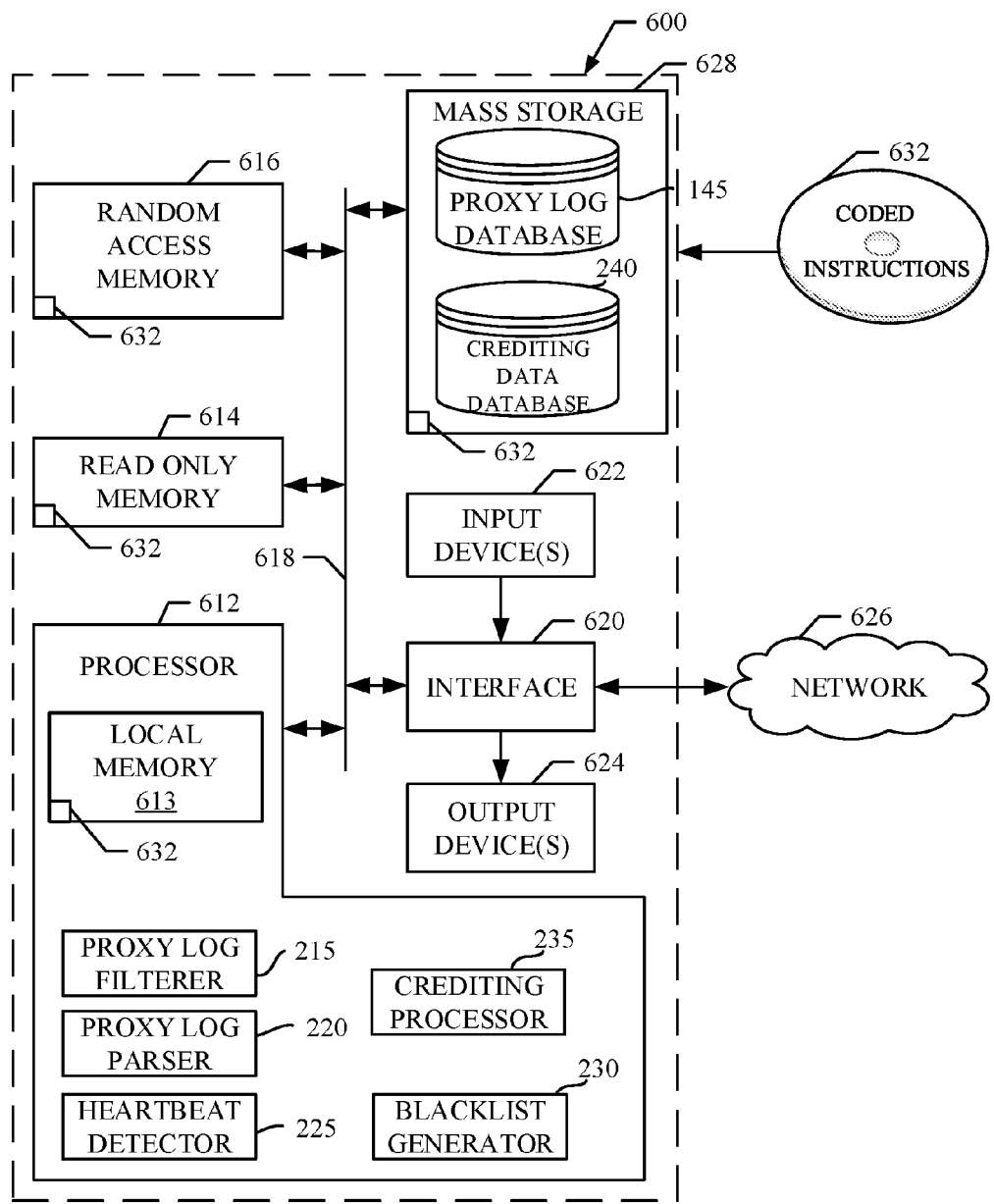
FIG. 6 is a block diagram of an example processor platform capable of executing the instructions of FIGS. 4 and/or 5 to implement the example central facility of FIG. 2.

FIG. 6 is a block diagram of an example processor platform 600 capable of executing the instructions of FIGS. 4 and/or 5 to implement the example central facility 210 of FIG. 2. The processor platform 600 can be, for example, a server, a personal computer, a mobile device (e.g., a cell phone, a smart phone, a tablet such as an iPad™), a personal digital assistant (PDA), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache), and executes instructions to implement the example proxy log filterer 215, the example proxy log parser 220, the example heartbeat detector 225, the example crediting processor 235, and/or the example blacklist generator 230. The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives. The example mass storage devices 628 implement the example proxy log database 145 and/or the example crediting data database 240.

The coded instructions 632 of FIGS. 4 and/or 5 may be stored in the mass storage device 628, in the volatile memory 614, in the non-volatile memory 616, and/or on a removable tangible computer readable storage medium such as a CD or DVD.

From the foregoing, it will be appreciated that the above disclosed methods, apparatus and articles of manufacture prevent illicit network communications from affecting a monitoring result. In examples disclosed herein, the blacklist is utilized by the proxy server 115 to prevent devices originating illicit communications from communicating via the proxy 115. By blocking devices from communicating via the proxy 115 (e.g., devices that have not been authorized to communicate via the proxy 115), processing resources of the proxy 115 are conserved for authorized devices (e.g., the mobile device 105). Likewise, network resources (e.g., bandwidth) of the proxy server 115 are reduced because illicit communications need not be serviced by the proxy 115.

In addition to processing and network resource efficiencies gained at the proxy server 115, the example approaches disclosed herein result in enhanced efficiencies with respect to the example central facility 210 as well. For example, once illicit communications are identified by the example central facility 210 and are excluded from future communication logs (by virtue of the proxy 115 blocking such communications), those illicit communications need not be analyzed by the central facility 210 to, for example, determine whether a panelist should be credited.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to prevent illicit network communications from affecting a monitoring result of an audience measurement entity, the method comprising:
   accessing, at the audience measurement entity, a log of communications from a proxy, the proxy to transmit a communication between a requesting device and a media provider;
   identifying a subnet represented in the log of communications;
   identifying, with a processor, the subnet as having a first address that originated an illicit network communication if the log of communications does not include at least one signature of a heartbeat message having a second address within the subnet, the heartbeat message identified by at least one of (1) comparing a user agent field of a record associated with the heartbeat message to user agent fields indicative of the record originating from a mobile device or (2) comparing a uniform resource locator field of the record to uniform resource locator fields indicative of the record originating from a mobile device, the heartbeat message associated with communication between the mobile device and a software provider, the illicit network communication indicating the record originated from a non-mobile device;
   generating a blacklist of subnets not to be serviced by the proxy, the blacklist including the subnet when the subnet is identified as having originated the illicit network communication; and
   providing the blacklist to the proxy, the blacklist to prevent a subnet that originated the illicit network communication from affecting the monitoring result of the audience measurement entity.

2. The method as disclosed in claim 1, wherein the identifying of the subnet as having originated the illicit network communication includes identifying that there are at least a threshold number of records originating from the subnet in the log of communications.

3. The method as disclosed in claim 1, further including:
   determining whether there are less than a threshold number of unique user agents identified by records of the log of communications associated with the subnet; and
   alerting an administrator of the subnet for manual inclusion in the blacklist.

4. The method as disclosed in claim 1, further including:
   determining whether there are greater than a threshold number of ports identified by records of the log of communications associated with the subnet; and
   alerting an administrator of the subnet for manual inclusion in the blacklist.

5. The method as disclosed in claim 1, further including:
   excluding, with the processor, records from the log of communications associated with the subnet to form a log of legitimate communications; and
   processing the log of legitimate communications to credit usage of mobile computing devices.

6. The method as disclosed in claim 1, wherein the log of communications is a current log of communications, and the blacklist includes the subnet when the subnet was identified as having originated illicit network communications in a prior log of communications from the proxy.

7. The method as disclosed in claim 6, wherein the prior log of communications corresponds to a first period of time immediately preceding a second period of time corresponding to the current log of communications from the proxy.

8. The method as disclosed in claim 1, wherein the blacklist does not include the subnet when the subnet has not been identified as having originated the illicit network communication for more than a threshold period of time.

9. An apparatus to prevent illicit network communications from affecting a monitoring result of an audience measurement entity, the apparatus comprising:
   a hardware logic circuit;
   a proxy log filterer to access, at the audience measurement entity, a log of communications from a proxy, the proxy to transmit a communication between a requesting device and a media provider;
   a heartbeat detector to identify a subnet within the log of communications as having a first address that originated an illicit network communication if the log of communications does not include at least one signature of a heartbeat message having a second address within the subnet, the heartbeat message identified by at least one of (1) comparing a user agent field of a record associated with the heartbeat message to user agent fields indicative of the record originating from a mobile device or (2) comparing a uniform resource locator field of the record to uniform resource locator fields indicative of the record originating from a mobile device, the heartbeat message associated with communication between the mobile device and a software provider, the illicit network communication indicating the record originated from a non-mobile device; and
   a blacklist generator to generate a blacklist of subnets not to be serviced by the proxy, the blacklist including the subnet when the subnet is identified as having originated the illicit network communication, the blacklist generator to provide the blacklist to the proxy, the blacklist to prevent a subnet that originated the illicit network communication from affecting the monitoring result of the audience measurement entity, wherein at least one of the proxy log filterer, the heartbeat detector, or the blacklist generator is implemented via the hardware logic circuit.

10. The apparatus as disclosed in claim 9, further including a crediting processor to generate the monitoring result using a subsequent log of communications created by the proxy, the subsequent log of communications excluding communications from the subnet identified in the blacklist.

11. The apparatus as disclosed in claim 9, further including a proxy log parser to determine whether there are less than a threshold number of unique user agents identified by records of the log of communications associated with the subnet, the proxy log parser to identify the subnet to an administrator when there are less than the threshold number of unique user agents identified by the records of the log of communications associated with the subnet.

12. The apparatus as disclosed in claim 9, further including a proxy log parser to determine whether there are greater than a threshold number of ports identified by records of the log of communications associated with the subnet, the proxy log parser to identify the subnet to an administrator when there are greater than the threshold number of ports identified by the records of the log of communications associated with the subnet.

13. The apparatus as disclosed in claim 9, wherein the blacklist does not include the subnet when the subnet has not been identified as having originated the illicit network communication for more than a threshold period of time.

14. A non-transitory computer-readable medium comprising instructions which, when executed, cause a central facility of an audience measurement entity to at least:
- access, at the central facility, a log of communications from a proxy, the proxy to transmit a communication between a requesting device and a media provider;
- identify a subnet represented in the log of communications;
- identify the subnet as having a first address that originated an illicit network communication if the log of communications does not include at least one signature of a heartbeat message having a second address within the subnet, the heartbeat message identified by at least one of (1) comparing a user agent field of a record associated with the heartbeat message to user agent fields indicative of the record originating from a mobile device or (2) comparing a uniform resource locator field of the record to uniform resource locator fields indicative of the record originating from a mobile device, the heartbeat message associated with communication between the mobile device and a software provider, the illicit network communication indicating the record originated from a non-mobile device;
- generate a blacklist of subnets not to be serviced by the proxy, the blacklist including the subnet when the subnet is identified as having originated the illicit network communication; and
- provide the blacklist to the proxy, the blacklist to prevent a subnet that originated the illicit network communication from affecting a monitoring result of the audience measurement entity.

15. The non-transitory computer-readable medium as disclosed in claim 14, wherein the instructions, when executed, further cause the central facility to identify that there are at least a threshold number of records in the log of communications.

16. The non-transitory computer-readable medium as disclosed in claim 14, wherein the instructions, when executed, further cause the central facility to at least:
- determine whether there are less than a threshold number of unique user agents identified by records of the log of communications associated with the subnet; and
- alert an administrator of the subnet for manual inclusion in the blacklist.

17. The non-transitory computer-readable medium as disclosed in claim 14, wherein the instructions, when executed, further cause the central facility to at least:
- determine whether there are greater than a threshold number of ports identified by records of the log of communications associated with the subnet; and
- alert an administrator of the subnet for manual inclusion in the blacklist.

18. The non-transitory computer-readable medium as disclosed in claim 14, wherein the instructions, when executed, further cause the central facility to at least:
- exclude records from the log of communications associated with the subnet to form a log of legitimate communications; and
- process the log of legitimate communications to credit usage of mobile computing devices.

19. The non-transitory computer-readable medium as disclosed in claim 14, wherein the log of communications is a current log of communications, and the blacklist includes the subnet when the subnet was identified as having originated illicit network communications in a prior log of communications from the proxy.

20. The non-transitory computer-readable medium as disclosed in claim 19, wherein the prior log of communications corresponds to a first period of time immediately preceding a second period of time corresponding to the current log of communications from the proxy.

21. The non-transitory computer-readable medium as disclosed in claim 14, wherein the blacklist does not include the subnet when the subnet has not been identified as having originated the illicit network communication for more than a threshold period of time.

* * * * *